US 8,286,012 B2

(12) United States Patent
Malhi et al.

(10) Patent No.: US 8,286,012 B2
(45) Date of Patent: *Oct. 9, 2012

(54) ARCHITECTURE INCORPORATING CONFIGURABLE CONTROLLER FOR REDUCING ON CHIP POWER LEAKAGE

(75) Inventors: Satinder Singh Malhi, Noida (IN); Arant Agrawal, New Dehli (IN)

(73) Assignee: STMicroelectronics Pvt. Ltd., Greater Noida (IN)

( * ) Notice: Subject to any disclaimer, the term of this patent is extended or adjusted under 35 U.S.C. 154(b) by 0 days.

This patent is subject to a terminal disclaimer.

(21) Appl. No.: 13/096,125

(22) Filed: Apr. 28, 2011

(65) Prior Publication Data

US 2011/0202782 A1    Aug. 18, 2011

Related U.S. Application Data

(63) Continuation of application No. 12/054,893, filed on Mar. 25, 2008, now Pat. No. 7,953,994.

(30) Foreign Application Priority Data

Mar. 26, 2007   (IN) .............................. 667/DEL/2007

(51) Int. Cl.
*G06F 1/00* (2006.01)
*G06F 1/26* (2006.01)

(52) U.S. Cl. ....................................... 713/300; 713/320

(58) Field of Classification Search .................. 713/300, 713/320
See application file for complete search history.

(56) References Cited

U.S. PATENT DOCUMENTS

| 5,303,171 | A | 4/1994 | Belt et al. |
| 5,339,437 | A | 8/1994 | Yuen |
| 7,096,374 | B2 * | 8/2006 | Srikantam et al. ............ 713/323 |
| 7,953,994 | B2 * | 5/2011 | Malhi et al. ................... 713/300 |
| 2003/0226048 | A1 | 12/2003 | Nguyen et al. |
| 2008/0133898 | A1 | 6/2008 | Newburn et al. |
| 2009/0089562 | A1 | 4/2009 | Schuchman et al. |

FOREIGN PATENT DOCUMENTS

JP    2004185576 A   *   7/2004

OTHER PUBLICATIONS

Abdollahi et al, Leakage Current Reduction in CMOS VLSI Circuits by Input Vector Control, Feb. 2004, IEEE Transactions on Very Large Scale Integration (VLSI) Systems, vol. 12 No. 2, pp. 140-154.*

* cited by examiner

*Primary Examiner* — Mark Connolly
(74) *Attorney, Agent, or Firm* — Hogan Lovells US LLP

(57) ABSTRACT

The present invention provides a method and system for controlling leakage power consumption at a System on Chip (SoC) level during a normal run or a boot-up mode. The leakage power reduction is achieved by incorporating a central programmable controller in the SoC architecture and test structures of idle SoC peripherals to place them into an Absolute Minimum Power consumption state with respect to static and dynamic power.

19 Claims, 12 Drawing Sheets

| Address | ROM Data Word |
|---|---|
| 0x0000 | Location of first FCW |
| 0x0001 | Location of second FCW |
|  |  |
| 0x0013 | Location of the last FCW |
| Location of first FCW | Offset Field / IPID field / Reserved |
|  | Word count field / Bit count field |
| Location of first FCW + 1 | MLV word 1 |
| Location of first FCW + 2 | MLV word 2 |
|  |  |
| Location of first FCW + offset | MLV word offset |
| Location of second FCW | Offset Field / IPID field / Reserved |
|  | Word count field / Bit count field |
| Location of second FCW + 1 | MLV word 1 |
| Location of second FCW + 2 | MLV word 2 |
|  |  |
| Location of second FCW + 2 | MLV word offset |
|  |  |
| Location of last FCW | Offset Field / IPID field / Reserved |
|  | Word count field / Bit count field |
| Location of last FCW + 1 | MLV word 1 |
| Location of last FCW + 2 | MLV word 2 |
|  |  |
| Location of last FCW + 2 | MLV word offset |
| Wakeup LUT location 1 | Branch address for program instructions for peripheral 1 |
| Wakeup LUT location 2 | Branch address for program instructions for peripheral 2 |
| Wakeup LUT location 3 | Branch address for program instructions for peripheral 3 |
|  |  |
| Wakeup LUT location for last peripheral | Branch address for program instructions for last peripheral |

FIG. 8

ARCHITECTURE INCORPORATING CONFIGURABLE CONTROLLER FOR REDUCING ON CHIP POWER LEAKAGE

RELATED APPLICATION

The present invention claims priority from, and is a continuation application of, U.S. patent application Ser. No. 12/054,893 filed Mar. 25, 2008 which claims priority of India Patent Application No. 667/Del/2007 filed Mar. 26, 2007, both of which are incorporated herein in their entirety by this reference.

FIELD OF THE INVENTION

The present invention relates to semiconductor devices and more specifically to a configurable architecture for controlling static and dynamic power consumption at a system level while maintaining a balance between the system latency and throughput.

BACKGROUND OF THE INVENTION

Power consumption is one of the major problems faced by the semiconductor industry. Conventionally, only dynamic power has been a significant source of power consumption. However, with the advancements in shrinking processor technology, the static power is also posing new challenges in microcontroller design.

Every CMOS digital circuit has a Minimum Leakage Vector (MLV) corresponding to which the circuit consumes the lowest amount of leakage power. This MLV corresponds to a specific vector set from the entire number of digital states that the logic can be in, considering all sequential elements and primary inputs. Identification of a minimum leakage vector (MLV) is an important problem in low power design of VLSI circuits. Unlike dynamic power, which depends on the average number of switching transistors per clock cycle, the leakage power depends on the number of on chip transistors, regardless of their average switching activity. The input pattern dependence of the leakage current makes the problem of determining the leakage power dissipated by a circuit a difficult one. This is because by applying the minimum leakage producing input combination to the circuit, when it is in the idle mode, the leakage power dissipation of the circuit can be reduced significantly. It is assumed that by using many of the known techniques and tools an MLV can be generated for each peripheral for use by the power control module (PCM).

FIG. 1 illustrates a block diagram of a conventional system 100 on chip (SoC) topology. The system 100 includes a core processor 102 that could be a typical high performance RISC/CISC CPU with a system bus interface 104, connected to the system bus infrastructure 106, a system bus to peripheral bus protocol conversion bridge 108, multiple peripherals such as 110A and 110B that are placed on a peripheral bus infrastructure 112 each containing its own peripheral bus interface 114A and 114B, a native or system bus interface 116 coupled from the core CPU 102 to a system ROM 118 and (or) a system RAM memory 120. The power supply for the system 100 is through a central voltage regulation unit 122. During a normal operation of the system 100, the core CPU 102 executes instructions by reading data from the ROM 118 or the RAM 120 memories through the native or system bus interface 116.

For SoC architectures, some conventional power reduction schemes like, clock gating, dynamic voltage scaling or power down approaches are solely focused upon the dynamic power reduction. The power domain creation method involves the classification of logic domains that will be active in various modes of operation of a device, like, a normal run mode and a standby mode of operation.

FIG. 2 illustrates a block diagram of a conventional system on chip (SoC) 200 having logic domains for different modes of operation. The voltage regulator supplies through supply pad 202. In the normal mode, the normal mode regulator maintains the supply to the normal and standby logic. During standby mode, power supply to the logic that remains inactive during standby mode is shut down using an analog switch 210 and the standby mode regulator maintains supply into this domain and the normal mode logic is powered down creating a power domain. This reduces the leakage current during the standby mode; however, it does not address the issue of leakage during normal run mode. Also, a large number of on chip analog switches are to be used which consume a much larger area.

In the peripheral clock gating, the clock to the peripherals is gated with a control signal (clock_gate) that is used to gate the peripheral clock (pclk) using an AND gate. FIG. 3 illustrates a block diagram of a peripheral clock gating. The clock gated peripheral retains its previous state of operation until the gate signal request is cleared. This approach addresses the issue of dynamic power reduction only and not the static power consumption.

It is assumed that the SoC has two modes of operation, namely a normal run mode of operation wherein a typical application program is placed in the ROM or RAM memories and many of the SoC peripherals may remain unused. Conventional approaches to control system power consumption during the normal run mode focus solely on reducing dynamic power consumption and none of them address the issue of static power reduction in the form of leakage power reduction. At low process technologies, static power consumption levels, in the form of leakage current, approach dynamic power consumption levels and form critical components of the consumed power. The other approach discussed addresses the issue of static and dynamic power consumption by the esoteric means of switching off the power supply to the core logic. This method increases the latency of the system, as the core logic must be reprogrammed through the system RAM or ROM on wakeup. The programming procedure cannot commence until and unless the system clock generation unit stabilizes and outputs a clock of constant phase and frequency which further adds to the system latency.

Therefore, there is a need for a novel architecture and method for simultaneously controlling the static as well as the dynamic power consumption of an SoC, while maintaining a balance between the system latency and throughput.

SUMMARY OF THE INVENTION

It is an object of the present invention to provide a configurable power control module for controlling power dissipation in a system on chip (SoC) architecture.

To achieve the aforementioned objective, the present invention provides a configurable power control module for controlling power dissipation in an architecture. The control module includes a read only memory (ROM) module for storing a plurality of minimum leakage vectors (MLVs) corresponding to a plurality of peripherals, a main control unit operatively coupled to the ROM module for placing of the plurality of peripherals into a lowest leakage state based on one of a boot-up mode and a normal run mode, and a control finite state machine (FSM) module operatively coupled to the main control unit for maintaining operations of the main control unit during said boot-up mode and said normal run mode. The control module further includes a programmable control register bank operatively coupled to the main control unit for controlling the functionality of the power control module through a user programmable instruction, a minimum leakage vector (MLV) chain shift unit operatively coupled with said programmable control register bank for shifting an MLV into a corresponding peripheral, and a scan chain logic unit operatively coupled to said MLV chain shift unit for scanning one or more of scan in, scan enable, scan clock signals. The control module also includes a device peripheral operatively coupled to the scan chain logic unit for interfacing with the plurality of peripherals, and a peripheral gating, clock and reset signal generation unit operatively coupled to the device peripheral for generating gating signals from primary inputs of the plurality of peripherals.

In an embodiment of the present invention, an architecture utilizing a power control module for reducing power leakage includes a plurality of peripherals, a CPU module operatively coupled with a system ROM, a system RAM and the plurality of peripherals. The architecture further includes a power control module operatively coupled with the plurality of peripherals and the CPU module through a plurality of peripheral buses for controlling power dissipation in said architecture.

Further, the present invention provides a method of placing a plurality of peripherals into an absolute minimum power state during a normal run mode cycle using a power control module (PCM). The method includes (a) programming a sleep request for a peripheral by a user, (b) reading a ROM lookup table (LUT) at a vector location corresponding to the peripheral, (c) branching to a frame construction word (FCW) of the peripheral through a main control module, (d) loading an offset counter with an offset field value for serially loading a minimum leakage vector (MLV) into the peripheral, and (e) gating primary inputs and primary outputs by a peripheral gate signal after a complete scan chain loading of the MLV.

Further, the present invention provides a method of placing a plurality of peripherals into an absolute minimum power state during a boot-up mode cycle using a power control module (PCM). The method includes (a) reading from a zero vector location of a ROM module by a PCM control unit, (b) receiving a branch address of a frame construction word (FCW) corresponding to a first peripheral, (c) decoding the FCW for getting an offset field value, (d) loading an offset counter with the offset field value, (e) sequentially reading contents of the ROM module until the offset counter value expires to zero, (f) storing read words into a word length shift register through a MLV shift logic of the PCM, (g) shifting the read words serially into a system peripheral utilizing a scan mode logic, (h) generating a peripheral gating signal using a combinational logic when the offset counter expires to zero; (i) repeating step (e) onwards when said offset counter has not expired to zero, (j) deactivating a peripheral clock, (k) placing the first peripheral into an absolute minimum power state; and (l) repeating step (a) onwards for the plurality of peripherals until an end of ROM appears.

Further the present invention provides a method of waking up a peripheral from an absolute minimum power (AMP) state into a normal run mode state using a power control module (PCM). The method includes (a) generating a peripheral reset signal, (b) decoding a wakeup bit corresponding to the peripheral in a wakeup request register, (c) reading a wakeup LUT from a PCM ROM when the wakeup bit is activated, (d) branching a PCM main control unit to a memory location given by the wakeup LUT, (e) reprogramming the peripheral into a normal run mode state; and (f) repeating step (b) onwards if all wakeup requests are not being processed.

BRIEF DESCRIPTION OF THE DRAWINGS

The aforementioned aspects and other features of the present invention will be explained in the following description, taken in conjunction with the accompanying drawings, wherein:

FIG. 8 illustrates a ROM table according to an embodiment of the present invention.

DETAILED DESCRIPTION OF PREFERRED EMBODIMENTS

Figure 1:
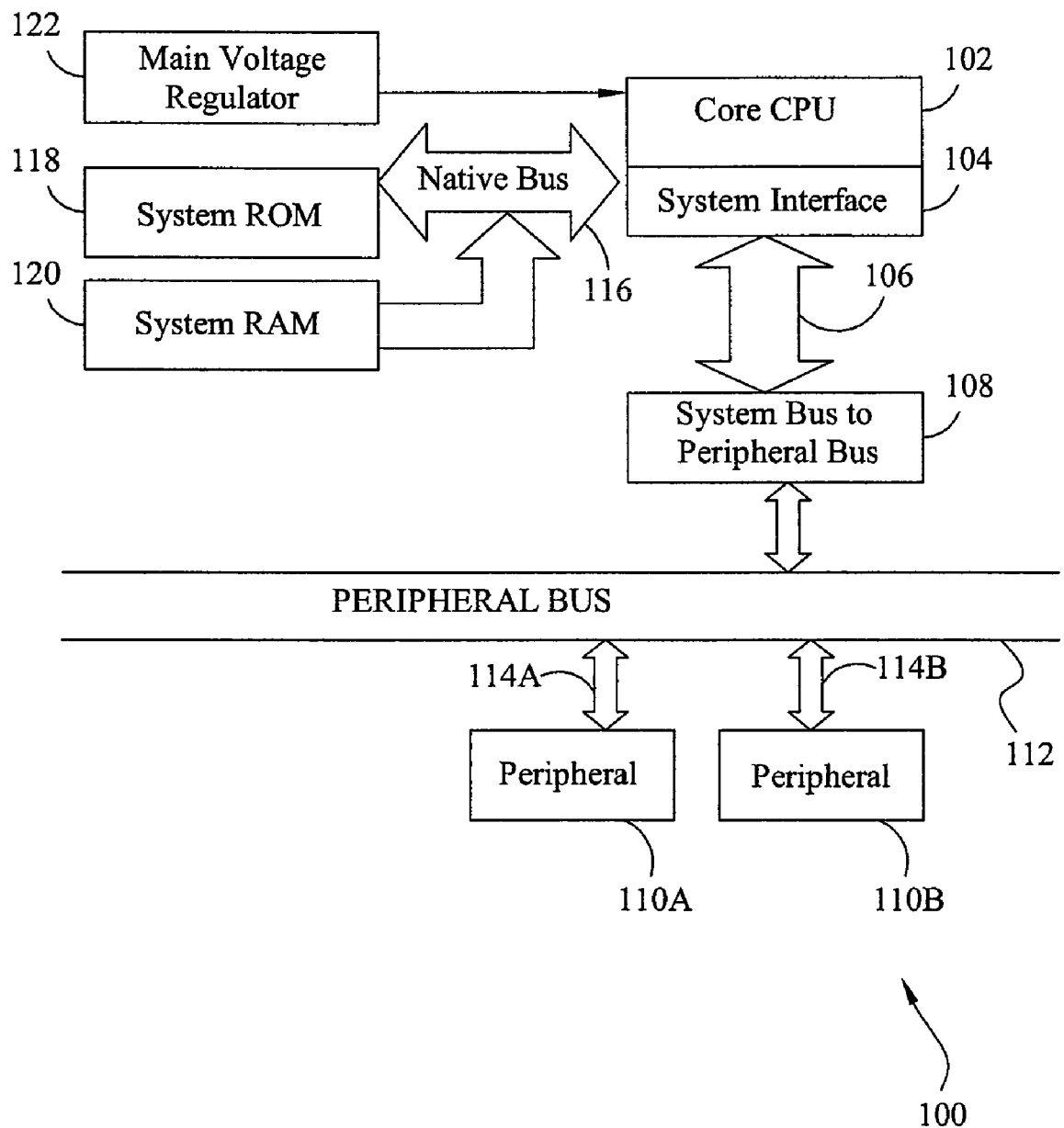
FIG. 1 illustrates a block diagram of a conventional SoC architecture.
Figure 2:
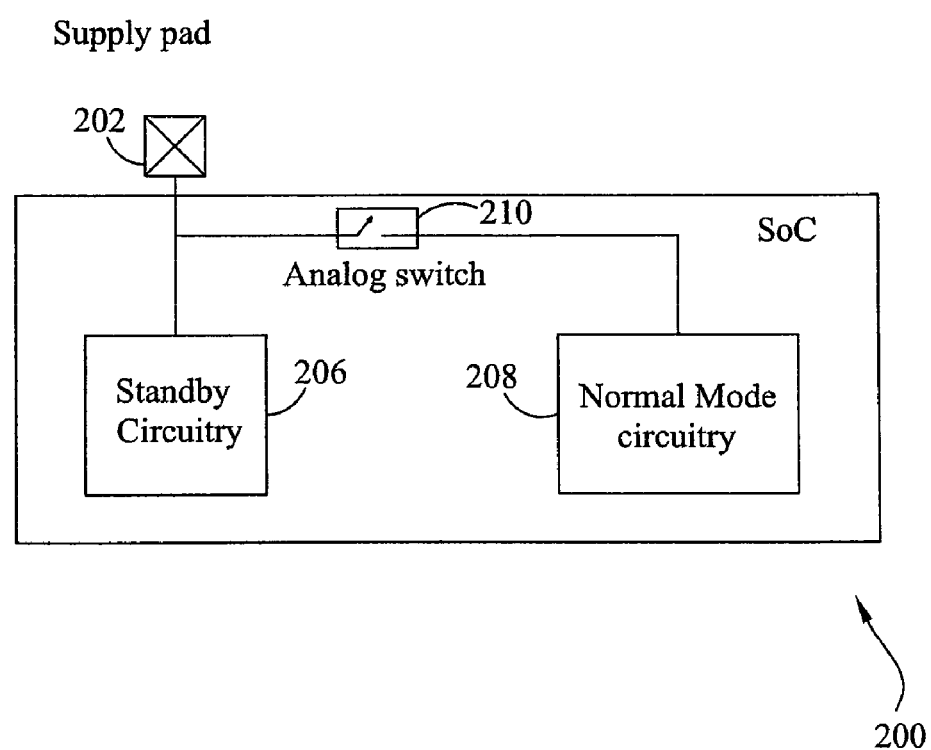
FIG. 2 illustrates a block diagram of another conventional SoC architecture.
Figure 3:
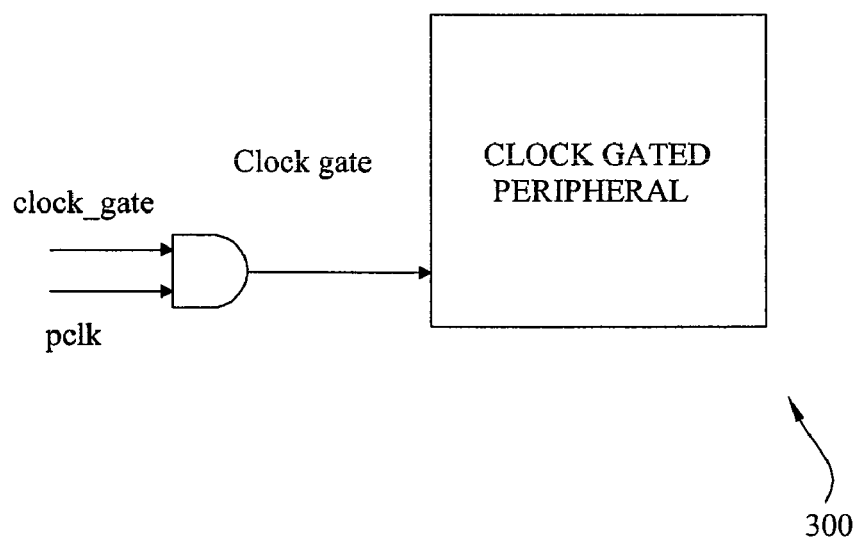
FIG. 3 illustrates a block diagram of a conventional peripheral clock gating scheme for reducing the power dissipation.

The preferred embodiments of the present invention will be described in detail with reference to the accompanying drawings. However, the present invention is not limited to the preferred embodiments and can be modified in various forms. The preferred embodiments of the present invention are only provided to explain more clearly the present invention to those of ordinary skill in the art to which the present invention pertains. In the accompanying drawings, like reference numerals are used to indicate like components.

Figure 4:
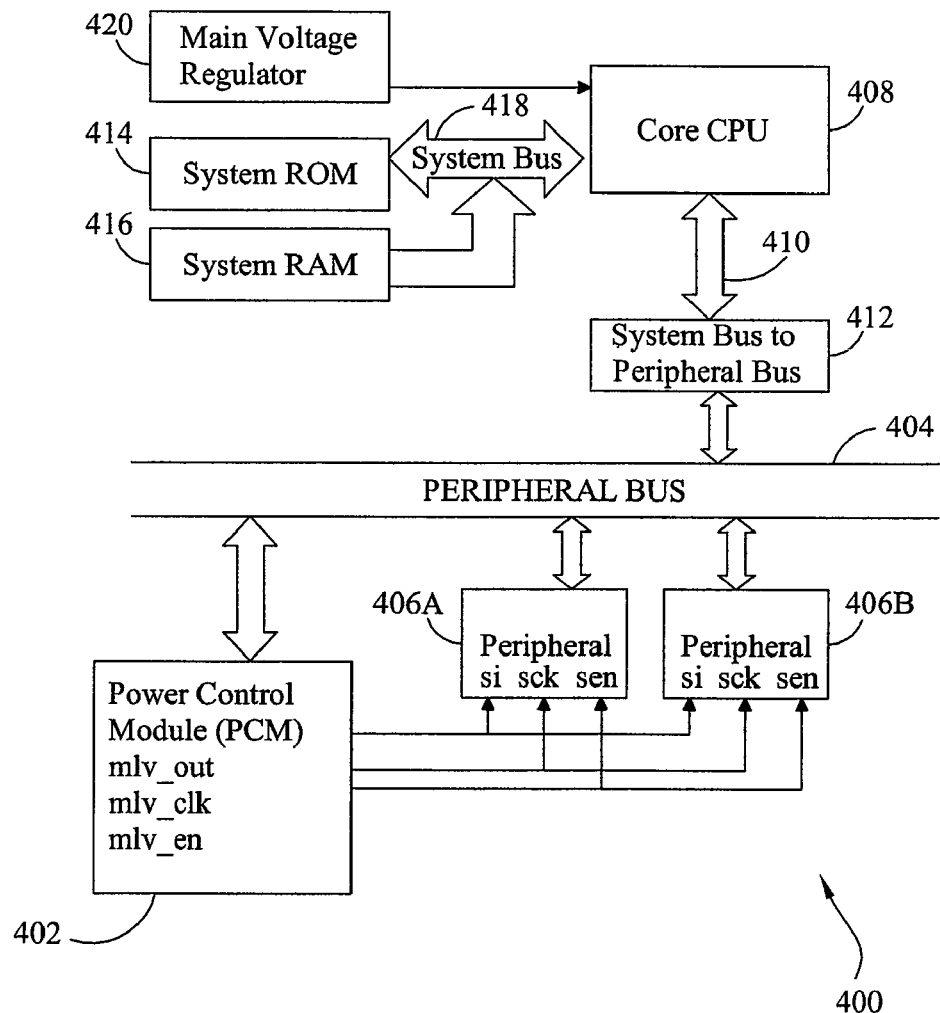
FIG. 4 illustrates a block diagram of an SoC architecture according to the present invention.

FIG. 4 illustrates a block diagram of an SoC architecture 400 according to an embodiment of the present invention. An object of the proposed architecture 400 is to ensure that the idle peripherals are kept in their absolute minimum power (AMP) states and thereby minimize the normal run mode power consumption. The SoC architecture 400 includes a programmable Power Control Module (PCM) 402 placed on a peripheral bus infrastructure 404, along with system peripherals such as 406A and 406B. The MO (MLV-Out), ME (MLV Enable) and MLV_CK (MLV clock) of the PCM 402 are connected to an existing JTAG compliant test interface of SI (Scan-In), SE (Scan Enable) and SCK (Scan Clock) respectively, for each peripheral 406A and 406B. A core CPU 408 is connected to a system bus infrastructure 410. A system bus infrastructure 410 is interfacing with the peripheral bus infrastructure 404 using a system to peripheral bus protocol converter 412. The core CPU 408 is provided interfacing to a system ROM 414 or a RAM 416 through a system bus interface 418. The power supply for the system is provided through a central voltage regulation unit 420.

Figure 5:
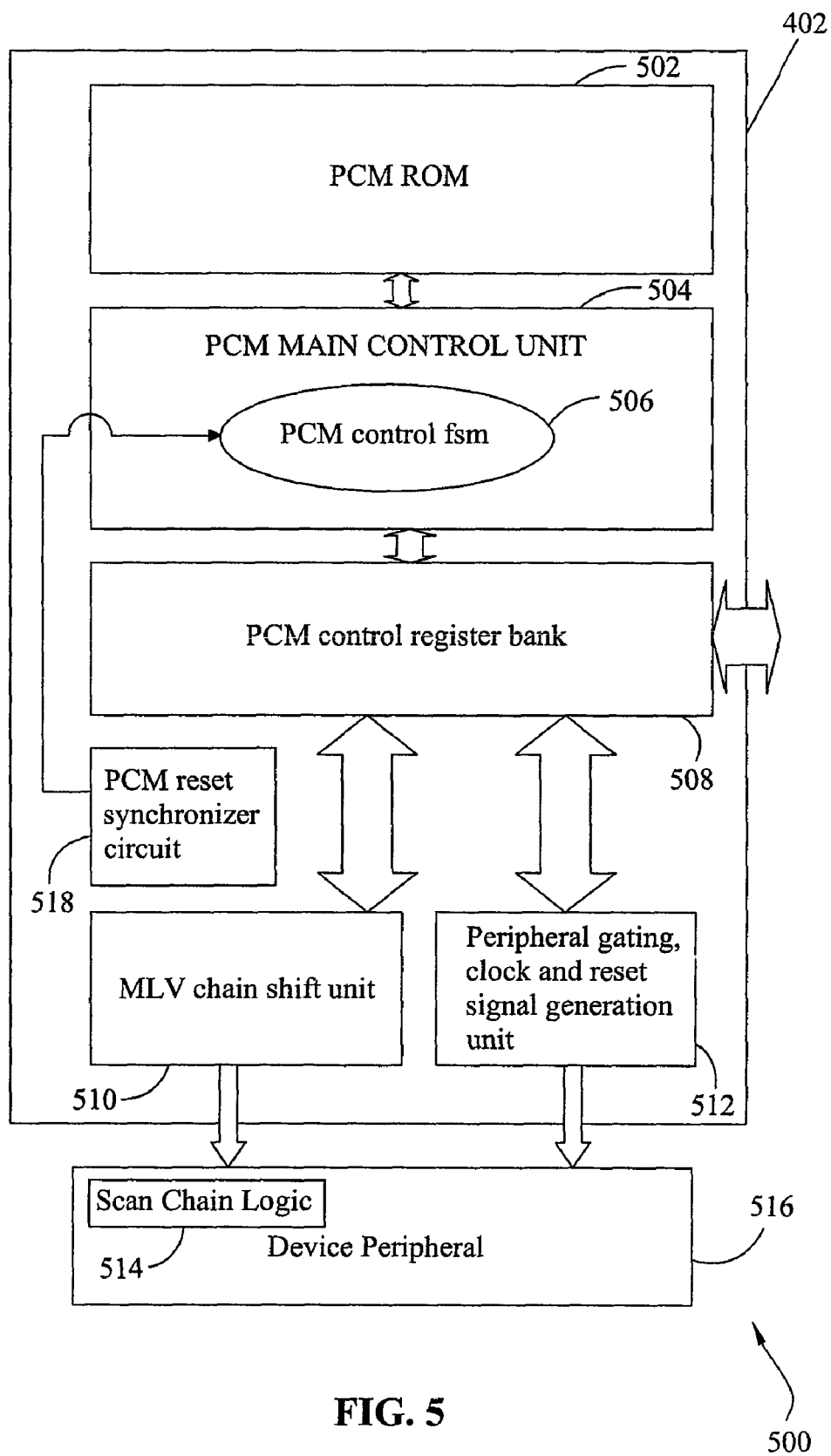
FIG. 5 illustrates a block diagram of a power control module (PCM) according to the present invention.

FIG. 5 illustrates a block diagram of the Power Control Module (PCM) 402 according to the present invention. The PCM 402 includes a read only memory (ROM) module 502, a main control unit 504 operatively coupled to the ROM module 502, a control finite state machine (FSM) module 506 operatively coupled to the main control unit 504, a programmable control register bank 508 operatively coupled to the main control unit 504, a minimum leakage vector (MLV) chain shift unit 510 operatively coupled to the programmable control register bank 508, a scan chain logic unit 514 operatively coupled to the MLV chain shift unit 510, a device peripheral 516 operatively coupled to the scan chain logic unit 514, a peripheral gating and reset signal generation unit 512 operatively coupled to the device peripheral 516, and a reset synchronizer circuit 518 operatively coupled to the control FSM module 506.

Multiple leakage vectors corresponding to multiple peripherals are stored in the ROM module 502. The peripherals are placed into a lowest leakage state, based on either a boot-up mode or a normal run mode through the main control unit 504. The control FSM module 506 maintains the functional operation of the main control unit 504 during the boot-up mode and the normal run mode.

The functionality of the PCM 402 is controlled by a user programmable set of registers or the control register bank 508. The MLV chain shift unit 510 is used to shift an MLV into a corresponding peripheral using an existing scan chain circuitry of the peripheral. The scan chain logic unit 514 is operatively coupled to the MLV chain shift unit 510 for controlling a scan in (SI) signal, a scan enable (SE) signal, and a scan clock (SCK) signal. The device peripheral 516 interfaces with the peripherals and the device peripheral 516 can be any generic device peripheral compliant with IEEE DFT architecture specifications. The peripheral gating and reset signal generation unit 512 generates the gating signals from primary inputs of the peripherals of the device. This reset is held de-asserted during scan chain shift of MLV. PCM asserts primary input and outputs gating signal after scan in. Other implementations of reset control through SoC reset control unit may also be possible but it is assumed here that through multiplexing, the reset and clock of peripheral are controllable by PCM after sleep request arrives. The unit 512 also generates a peripheral level reset in case the peripheral is woken up from an absolute minimum power (AMP) state.

Figure 6:
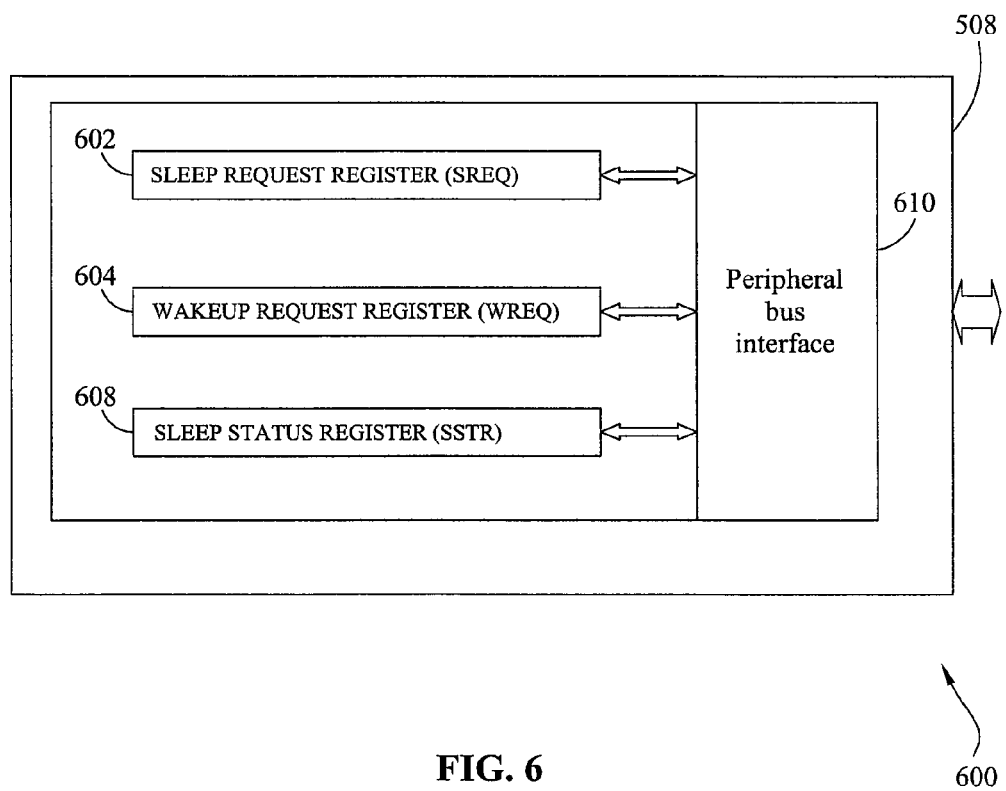
FIG. 6 illustrates a block diagram of a Control Register Bank used in power control module (PCM) according to the present invention.

FIG. 6 illustrates a block diagram of the control register bank 508 according to the present invention. The control register bank 508 includes a set of three registers, namely, a Sleep Request Register (SREQ) 602, a Wakeup Request Register (WREQ) 604, and a Sleep Status Register (SSTR) 608. The register bank 508 further includes a peripheral bus interface 610. The Sleep Request Register (SREQ) 602 is used to generate a sleep request to program a particular peripheral with its minimum leakage vector (MLV). Each peripheral has a separate bit in Sleep Request Register (SREQ) 602. To generate a sleep request for a particular peripheral, the corresponding bit is set. The Wakeup Request Register (WREQ) 604 is used to generate a wakeup request for resetting and reprogramming the peripheral from its lowest power consumption state. Each peripheral of the device has a separate wakeup bit that can be set to wakeup the peripheral. The Sleep Status Register (SSTR) 608 is used as a status register to check whether the sleep requested peripheral has been placed into its AMP state. Each peripheral that can be given a sleep request has a bit in this register to monitor the status of the peripheral. In case the peripheral is in its AMP state then the corresponding bit in the Sleep Status Register (SSTR) 608 is set. The registers in the PCM control register bank 508 except Sleep Status Register (SSTR) are user programmable through the peripheral bus interface 610 propagating from the system CPU side.

Figure 7:
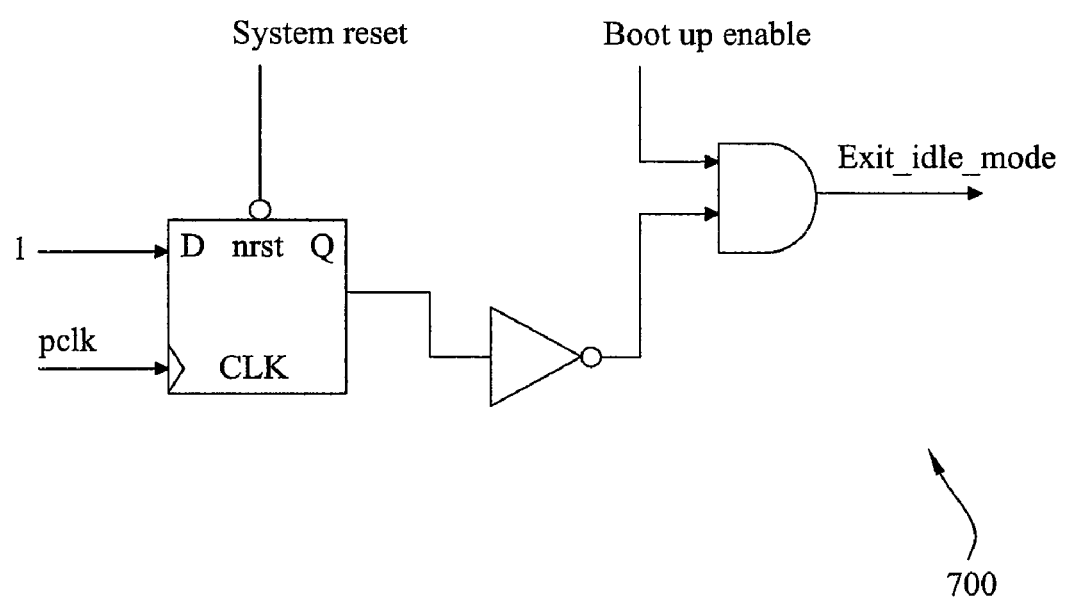
FIG. 7 illustrates a block diagram of a system reset synchronizer circuit according to the present invention.

FIG. 7 illustrates a block diagram of the system reset synchronizer circuit 518. When the system reset is asserted then an exit_idle_mode signal is generated only when the Boot-up enable is high. If the Boot-up enable is low then the exit_idle_mode signal remains low and the state machine remains in the IDLE mode itself. The system reset synchronizer circuit 518 allows proper transition between the IDLE and the BOOTUP of the control FSM module 506.

There can be various embodiments in which ROM can be programmed for various paradigms through the ROM tables. One of the embodiments of the PCM ROM table is shown in FIG. 8. A look up table (LUT) is used at the first few locations of the ROM 502. Each vector location of the LUT corresponds to the address of the frame construction word (FCW) corresponding to a system peripheral. Thus the length of the LUT is kept equal to the number of system peripherals placed on the peripheral bus infrastructure. The FCW contains two fields—an offset field and an IP ID field. The offset field specifies the number of words that need to be read for getting the complete MLV for the peripheral and the IP ID field is decoded to generate the peripheral gating signal.

The operation of the PCM 402 may be divided into two main phases, the Boot-up mode and the Run mode. If the exit_idle_mode is enabled then during reset release, the PCM 402 then enters the Boot-up mode of operation and returns to idle. When the user does not program a sleep request, the control FSM 506 keeps the PCM 402 in an IDLE state.

Figure 9:
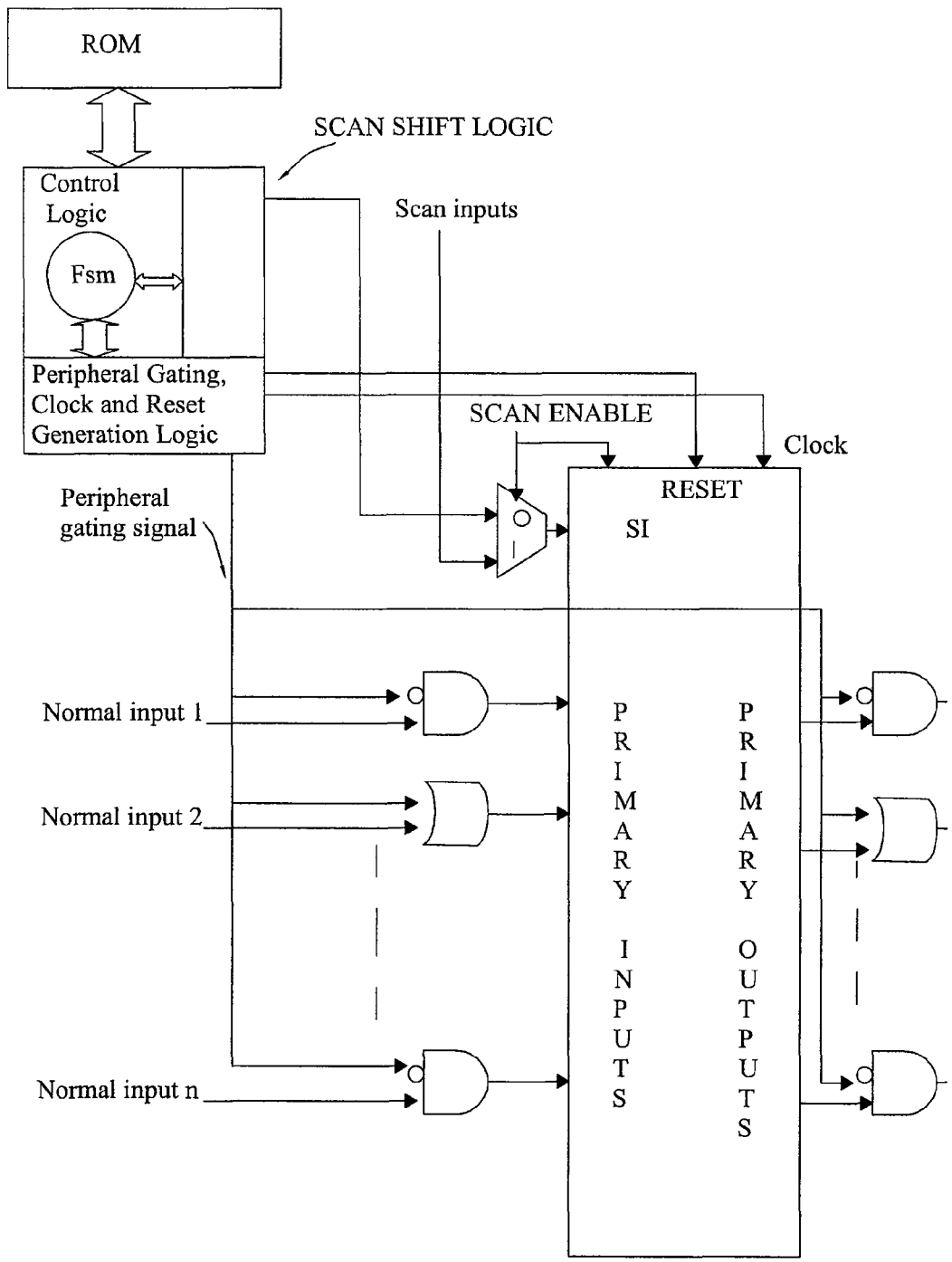
FIG. 9 illustrates a block diagram of a MLV Chain Shift Unit according to the present invention.

FIG. 9 illustrates an internal embodiment of the MLV controller and the associated peripheral MLV shift circuitry.

Figure 10:
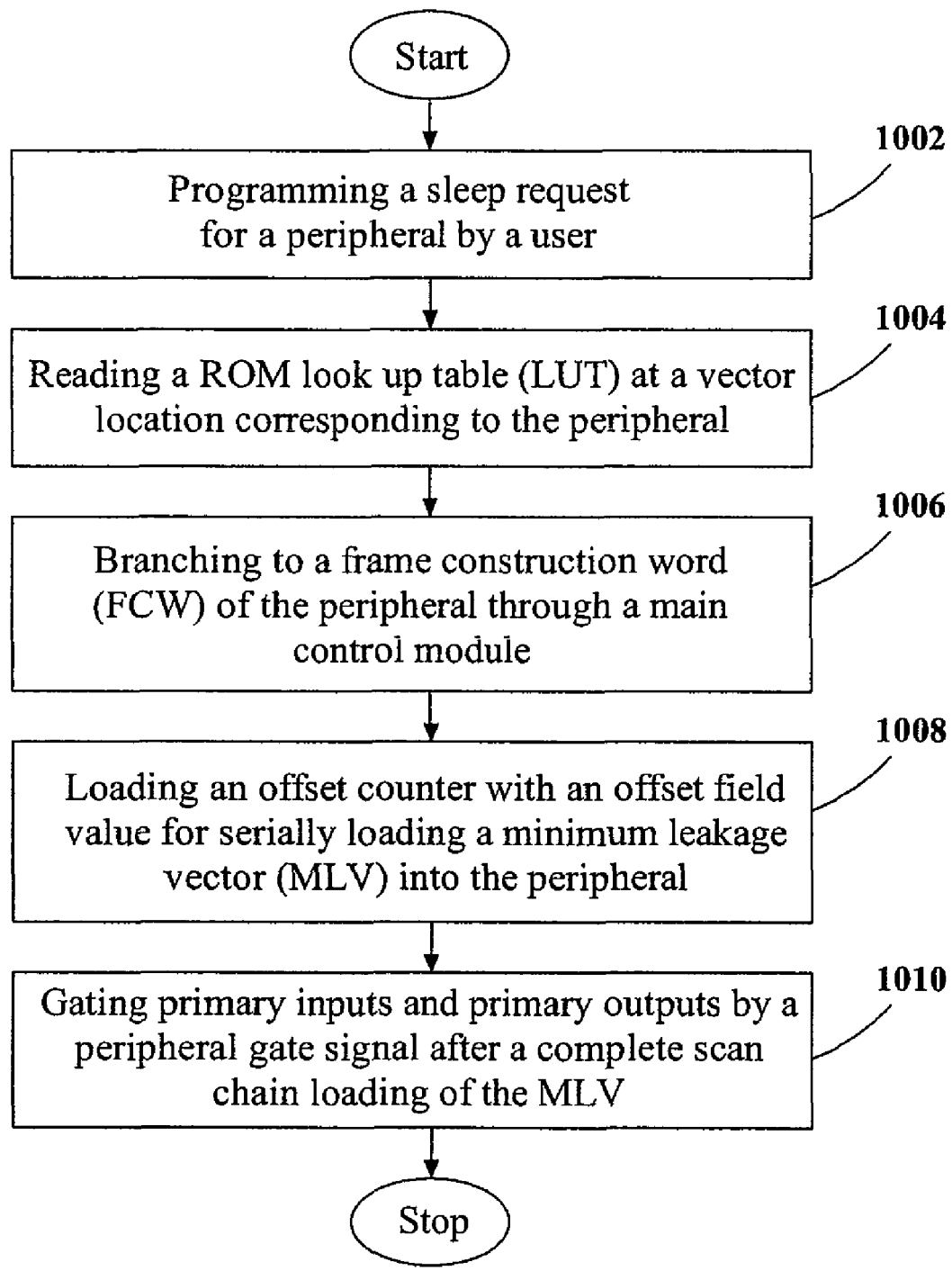
FIG. 10 illustrates a flow diagram of a method for placing multiple peripherals into an absolute minimum power state during a normal run mode according to the present invention.

FIG. 10 illustrates a flow diagram of a method to place the device peripherals into their lowest leakage state during a normal run mode according to the present invention. When a sleep request is programmed by the user for a peripheral by setting the corresponding bit for the peripheral to active high in the SREQ register of the control register bank 508 then the PCM control unit 504 reads the ROM LUT at the vector location corresponding to the peripheral for which the sleep mode is requested. The PCM main control 504 then branches to the FCW of the specified peripheral and loads the offset counter with the offset value field and begins to serially load the MLV into the requested peripheral. During this time the PCM will hold the reset for the peripheral de-asserted to enable scan in. When the scan chain loading of the MLV is completed and the primary inputs and outputs have been gated by the peripheral gate signal, then the bit corresponding to the peripheral placed into the AMP state is made high in the Sleep Status Register 608.

At step 1002, a sleep request for a peripheral is programmed by a user. At step 1004, a ROM look up table (LUT) at a vector location corresponding to the peripheral is read. Branching to a frame construction word (FCW) of the peripheral through a main control module is done at step 1006. At step 1008, an offset counter is loaded with an offset field value for serially loading a minimum leakage vector (MLV) into the peripheral. At step 1010, the primary inputs and the primary outputs are gated by a peripheral gate signal after a complete scan chain loading of the MLV.

Figure 11:
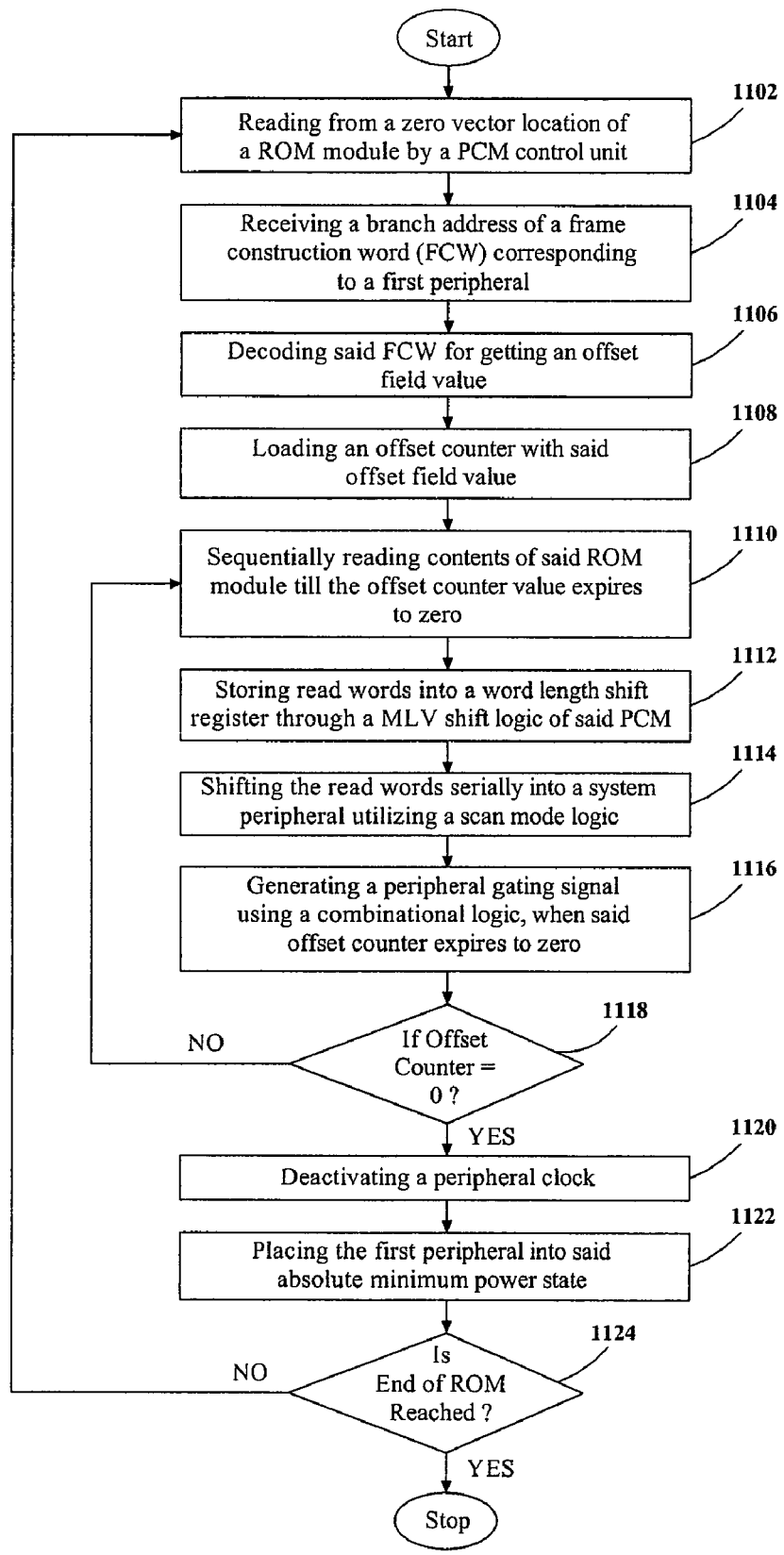
FIG. 11 illustrates a flow diagram of a method for placing multiple peripherals into an absolute minimum power state during a boot-up mode according to the present invention.

FIG. 11 illustrates a flow diagram of a method for placing peripherals into an absolute minimum power state during a boot-up mode. In the boot-up mode the PCM control unit 504 reads from the zero$^{th}$ vector location of the PCM ROM 502 to get the branch address of the FCW corresponding to the first peripheral 406A. The FCW is decoded and an offset counter is loaded with the value of the offset field. The contents of the ROM 502 are read sequentially until the offset counter value expires to zero. The MLV shift logic of the PCM 402 continuously stores the read words into a word length shift register and continuously shifts them serially into the system peripherals utilizing their scan mode logic. Once the MLV has been serially loaded into the peripheral, i.e., the offset counter has expired to zero, then the peripheral gating signal is generated combinationally. To generate a logic one on the primary input an OR gate logic with the normal input and the peripheral gate signal is used. To generate a logic zero on the primary input, an AND gate logic with the normal input and the negated peripheral gate signal is used. This gating scheme for the primary inputs obviates the need for having a separate multiplexer for all primary inputs of the system peripheral. The clock to the peripheral is then stopped and the peripheral is thus placed into the absolute minimum power consumption state with respect to both the static and dynamic power. The ROM 502 is sequentially read and the above-defined AMP state placement procedure is followed for all peripherals, until the End of Rom indicator, which indicates that all the peripherals have been placed into their AMP state, is read in.

At step 1102, the PCM control unit reads from a zero vector location of the ROM. At step 1104, a branch address of a frame construction word (FCW) corresponding to a first peripheral is received. At step 1106, the FCW is decoded for getting an offset field value. At step 1108, the offset counter is loaded with the offset field value. At step 1110, the contents of the ROM module are sequentially read until the offset counter value expires to zero. The read words are stored into a word length shift register through an MLV shift logic of the PCM, at step 1112. At step 1114, the read words serially shifted into a system peripheral utilizing a scan mode logic. At step 1116, a peripheral gating signal is generated using a combinational logic, when said offset counter expires to zero. At step 1118, if the offset counter does not expire to zero, then step 1110 onwards is repeated. At step 1120, the peripheral clock is deactivated. At step 1122, the first peripheral is placed into the absolute minimum power state. At step 1124, if end of ROM indicator is reached, the process stops. If end of ROM indicator is not reached then, go to step 1102.

When a sleep request is programmed by the user for a peripheral, by setting the corresponding bit for the peripheral to one in the SREQ register of the control register bank 508, the PCM control unit 504 reads the ROM LUT at the vector location corresponding to the peripheral for which the sleep mode is requested. The PCM control unit 504 then branches to the FCW of the specified peripheral and loads the offset counter with the offset value field and begins to serially load the MLV into the requested peripheral. When the scan chain loading of the MLV is completed and the primary inputs and outputs have been gated by the peripheral gate signal, then the bit corresponding to the peripheral placed into the AMP state is made high in the Sleep Status Register 608.

Figure 12:
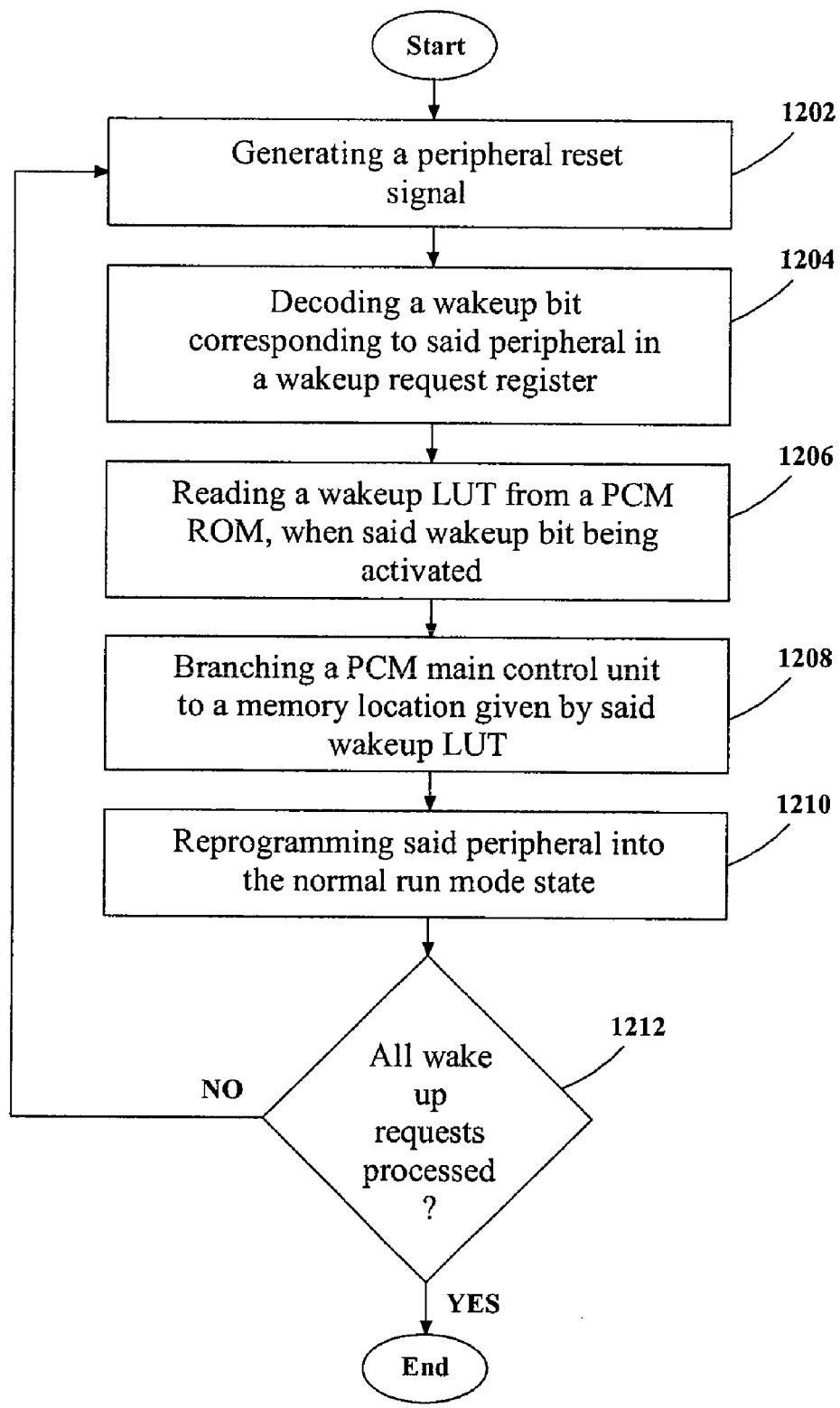
FIG. 12 illustrates a flow diagram of a method for waking up a peripheral from an absolute minimum power (AMP) state into a normal run mode according to the present invention.

FIG. 12 illustrates a flow diagram of a method of waking up a peripheral from an AMP state into a normal run mode state. At step 1202, a peripheral reset signal is generated. At step 1204, a wakeup bit corresponding to the peripheral is decoded in a wakeup request register. At step 1206, a wakeup LUT from a PCM ROM is read, when said wakeup bit is activated. At step 1208, a PCM main control unit is branched to a memory location given by said wakeup LUT. At step 1210, the peripheral is reprogrammed into the normal run mode state. At step 1212, if all wake up requests are processed, the process stops. If wake up requests are not processed, then go to step 1202. The Sleep Request Register (SREQ) bit for the corresponding peripheral that has woken up is reset and corresponding Sleep Status Register (SSTR) is also reset by hardware. This methodology could further be trimmed to save wakeup latency if it is of not concern to the system for the peripheral to wakeup in a known desired state. Peripheral wakeup in reset state may be fine for many system requirements which would make implementation much easier.

The proposed architecture offers several advantages. First, it reduces both static and dynamic leakage of the system while maintaining a balance between the system latency and throughput. Secondly, the present architecture consumes less area than conventional topologies.

Although the disclosure of circuit and method has been described in connection with the embodiment of the present invention illustrated in the accompanying drawings, it is not limited thereto. It will be apparent to those skilled in the art that various substitutions, modifications and changes may be made thereto without departing from the scope and spirit of the disclosure.

We claim:

1. A power control module comprising:
   a read only memory (ROM) module;
   a main control unit operatively coupled to the ROM module;
   a programmable control register bank operatively coupled to the main control unit;
   a minimum leakage vector (MLV) chain shift unit operatively coupled to the programmable control register bank; and
   a peripheral gating and reset signal generation unit operatively coupled to a device peripheral.

2. The power control module of claim 1 further comprising a control finite state machine (FSM) module operatively coupled to the main control unit.

3. The power control module of claim 2 further comprising a reset synchronizer circuit operatively coupled to the control FSM module.

4. The power control module of claim 1 wherein the control register bank comprises a plurality of registers.

5. The power control module of claim 1 wherein the control register bank comprises a sleep request register.

6. The power control module of claim 1 wherein the control register bank comprises a wakeup request register.

7. The power control module of claim 1 wherein the control register bank comprises a sleep status register.

8. A system comprising:
   a minimum leakage vector power control module; and
   a device peripheral coupled to the minimum leakage vector power control module,
   wherein the minimum leakage vector power control module comprises:
   a read only memory (ROM) module;
   a main control unit operatively coupled to the ROM module;
   a programmable control register bank operatively coupled to the main control unit;
   a minimum leakage vector (MLV) chain shift unit operatively coupled to the programmable control register bank; and
   a peripheral gating and reset signal generation unit operatively coupled to the device peripheral, and
   wherein the MLV chain shift unit is used to shift an MLV into a corresponding peripheral using an existing scan chain circuitry of the peripheral.

9. The system of claim 8 further comprising a control finite state machine (FSM) module operatively coupled to the main control unit.

10. The system of claim 9 further comprising a reset synchronizer circuit operatively coupled to the control FSM module.

11. The system of claim 9 wherein the control FSM module maintains functional operation of the main control unit during a boot-up mode and a normal run mode.

12. The system of claim 8 wherein the control register bank comprises a plurality of registers.

13. The power control module of claim 8 wherein the control register bank comprises a sleep request register.

14. The system of claim 8 wherein the control register bank comprises a wakeup request register.

15. The system of claim 8 wherein the control register bank comprises a sleep status register.

16. The system of claim 8 wherein the device peripheral comprises a scan chain logic unit.

17. The system of claim 8 wherein the peripheral is placed into a lowest leakage state.

18. The system of claim 17 wherein the lowest leakage state is based on either a boot-up mode or a normal run mode through the main control unit.

19. The system of claim 8 wherein the scan chain logic unit Is operatively coupled to the MLV chain shift unit for controlling a scan In (SI) signal, a scan enable (SE) signal, and a scan clock (SCK) signal.

\* \* \* \* \*